Sept. 25, 1923.

W. INHELDER

GLIDER

Filed Oct. 14, 1922

1,469,156

WITNESSES
H. Martin
H. Harrison Off

INVENTOR
William Inhelder
BY
ATTORNEYS

Patented Sept. 25, 1923.

1,469,156

UNITED STATES PATENT OFFICE.

WILLIAM INHELDER, OF TORONTO, ONTARIO, CANADA.

GLIDER.

Application filed October 14, 1922. Serial No. 594,599.

*To all whom it may concern:*

Be it known that I, WILLIAM INHELDER, a citizen of Switzerland, and a resident of Toronto, Province of Ontario, and Dominion of Canada, have invented new and Improved Gliders, of which the following is a full, clear, and exact description.

This invention has relation to aeronautical devices and has particular reference to a gliding machine.

As an object the invention contemplates a motorless heavier than air machine which is so constructed as to permit of the carrying of an operator and the maintenance of the machine in flight for an appreciable length of time by the utilization of air currents.

As a further object the invention contemplates a gliding machine which is provided with manually adjustable wings constituting climbing surfaces and a foot actuated elevation controlling rudder whereby the operator may readily control the direction and elevation of the machine after a take-off.

As a further object the invention resides in the provision of a gliding machine which is extremely simple in its construction, inexpensive to manufacture, and which may be readily manipulated by unskilled as well as skilled operators.

With the above recited and other objects in view, the invention resides in the novel construction set forth in the following specification, particularly pointed out in the appended claims and illustrated in the accompanying drawing, it being understood that the right is reserved to embodiments other than those actually illustrated herein to the full extent indicated by the general meaning of the terms in which the claims are expressed.

In the drawing—

Figure 1:
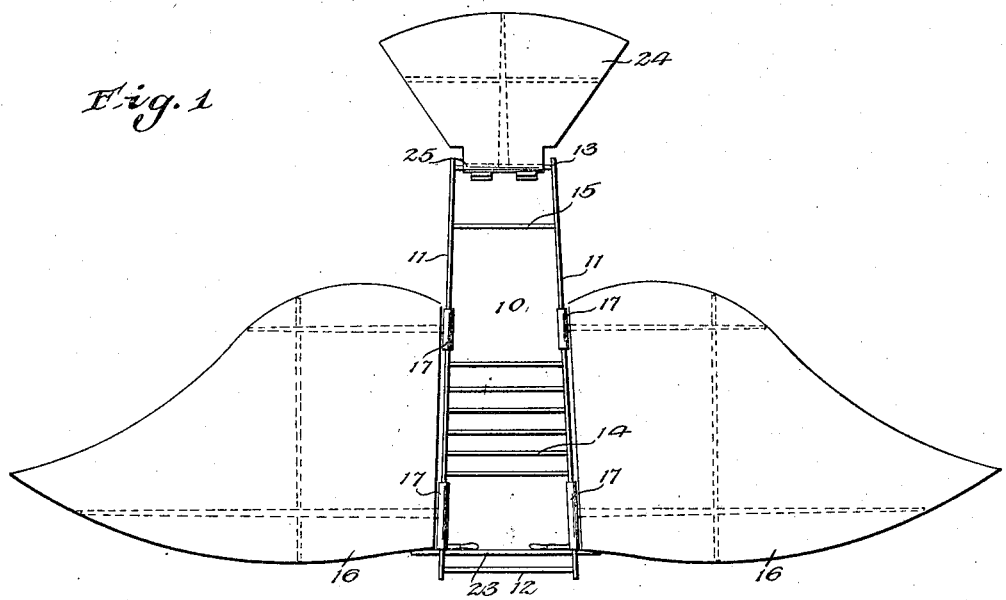
Figure 1 is a plan view of a gliding machine constructed in accordance with the invention.
Figure 2:
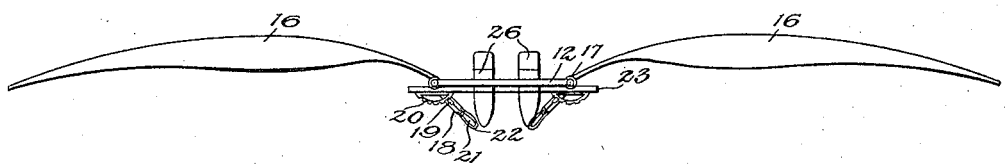
Figure 2 is a front view thereof.
Figure 3:
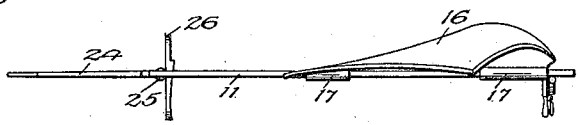
Figure 3 is a side view of the same.
Figure 4:
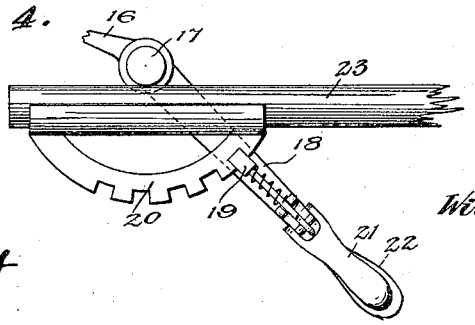
Figure 4 is an enlarged fragmentary front view illustrating the wing controlling means.

Referring to the drawing by characters of reference, 10 designates the frame of the glider which consists of side frame rails 11 connected by the front and rear cross-bars 12 and 13 and a plurality of closely spaced parallel intermediate crossbars 14 which serve as a body rest for the operator. Immediately in advance of the rear crossbar 13 a crossbar 15 is provided, the purpose of which will be hereafter set forth. The glider is provided with a pair of wings 16 which are respectively pivoted or hinged as at 17 to the side rails 11 for the upward and downward swinging movement. Each wing adjacent its forward hinge or pivot 17 is provided with a controlling lever 18 having a spring pressed detent 19 which cooperates with a segment or arcuate rack 20 for holding the wing in its adjusted position. A manipulating element 21 is operatively connected to the detent and is located adjacent the hand grip 22 of the lever whereby the operator may readily disengage the detent from the rack or segment 20. The racks or segments 20 are supported from a stationary cross rod 23 immediately in rear of the front crossbar 12. An elevation controlling rudder 24 is hinged or pivoted for vertical swinging movements as at 25 on the rear crossbar 13 and a pair of foot rests or pedals 26 are attached to said rudder whereby the operator may control the movements of the same with the feet.

In use and operation, after the take-off, the operator rests his body in a prone position on the crossbars 14 with the lower part of the legs supported by the crossbar 15 and the feet engaging the foot rests or pedals while the hands grasp the hand grips 22 of the levers 18. By manipulating the elevation control rudder 24 with the feet the glider may be properly manipulated to ascend or descend, while by the proper manipulation of the wing 16 the planing surfaces presented thereby may be controlled for the proper banking of the machine while turning. During the take-off, the operator's legs depend through the space between the crossbars 14 and the crossbar 15 and after the take-off the legs are positioned in prolongation to the body and rest upon the crossbar 15. It will thus be seen that an extremely simple, light, strong and durable glider has been provided which may be easily manipulated and handled by those unskilled in aeronautics as well as skilled operators.

I claim:

1. A glider comprising a skeleton frame upon which the operator lies prostrate, wings hinged to the forward part of the sides of the frame, operating hand levers secured to the forward portions of the wings and extending downwardly below the frame, said levers being provided with spring pressed detents, segments depending from the frame and engaged by the detents, a rudder pivoted to the rear of the frame, and foot pedals secured to said rudder.

2. A glider comprising a skeleton frame upon which the operator lies prostrate, wings hinged to the forward part of the sides of the frame, means for independently swinging said wings and locking them in position, said means including hand levers at the forward ends of the wings and projecting below the frame, a rudder hinged to the rear part of the frame, and foot pedals secured to the rudder.

3. A glider comprising a frame formed of side rails, front and rear cross bars, a plurality of spaced intermediate cross bars forming a body rest and a cross bar adjacent the rear cross bar, wings hinged to the forward ends of the side rails, levers connected with the forward ends of the wings and extending below the frame for swinging said wings, means for locking the wings in position, a rudder pivoted to the rear cross bar of the frame and foot rests or pedals secured to the pivoted end of the rudder.

WILLIAM INHELDER.